United States Patent
Ovenshire et al.

(10) Patent No.: US 9,188,302 B2
(45) Date of Patent: Nov. 17, 2015

(54) VEHICLE AND A HEADLAMP ASSEMBLY FOR THE VEHICLE

(71) Applicant: GM GLOBAL TECHNOLOGY OPERATIONS LLC, Detroit, MI (US)

(72) Inventors: Jay H. Ovenshire, Rochester, MI (US); Andrzej Wasilewski, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 153 days.

(21) Appl. No.: 14/133,771

(22) Filed: Dec. 19, 2013

(65) Prior Publication Data

US 2015/0176794 A1    Jun. 25, 2015

(51) Int. Cl.
*F21V 7/00* (2006.01)
*F21S 8/10* (2006.01)

(52) U.S. Cl.
CPC ............. *F21S 48/1742* (2013.01); *F21S 48/13* (2013.01)

(58) Field of Classification Search
CPC ......... F21S 10/063; F21S 10/00; F21S 48/00; F21S 48/1742; F21S 48/1752
USPC ......... 362/516, 508, 512, 513, 523, 525, 526, 362/532
See application file for complete search history.

(56) References Cited

U.S. PATENT DOCUMENTS

| | | | | |
|---|---|---|---|---|
| 4,333,131 A | * | 6/1982 | Hujimoto et al. | 362/549 |
| 6,478,457 B1 | * | 11/2002 | Manley | 362/465 |
| 7,175,319 B2 | * | 2/2007 | Tajima et al. | 362/465 |
| 8,007,151 B2 | * | 8/2011 | Tajima | 362/523 |
| 8,608,357 B2 | * | 12/2013 | Abe | 362/523 |
| 8,992,061 B2 | * | 3/2015 | Abe | 362/528 |
| 2010/0110709 A1 | * | 5/2010 | Tajima | 362/509 |

* cited by examiner

*Primary Examiner* — Ali Alavi
(74) *Attorney, Agent, or Firm* — Quinn Law Group, PLLC

(57) ABSTRACT

A vehicle and a headlamp assembly for the vehicle are disclosed. The headlamp assembly includes a light device movable about a center point of rotation. The headlamp assembly also includes a first member supporting the light device. The first member has a partially spherical configuration. The headlamp assembly further includes a second member supporting the first member. The second member has a partially spherical configuration complementary to the partially spherical configuration of the first member to allow movement of the light device about the center point of rotation.

20 Claims, 4 Drawing Sheets

VEHICLE AND A HEADLAMP ASSEMBLY FOR THE VEHICLE

TECHNICAL FIELD

The present disclosure relates to a vehicle and a headlamp assembly for the vehicle.

BACKGROUND

Many vehicles utilize a pair of headlamps to light up an area in front of the vehicle. One type of headlamp utilizes a lens to magnify the light exiting the headlamp. Another type of headlamp utilizes a mirror to reflect the light exiting the headlamp.

In some vehicles, the headlamp is adjustable to change the location that the light projects in front of the vehicle. One or more pins are attached to a bracket and the headlamp to move the headlamp. Specifically, the pins define one or more pivot points that the headlamp can move relative to and change the position of the headlamp. A motor can be attached to the bracket to move the bracket and the headlamp as a unit relative to the pivot points.

SUMMARY

The present disclosure provides a headlamp assembly for a vehicle. The headlamp assembly includes a light device movable about a center point of rotation. The headlamp assembly also includes a first member supporting the light device. The first member has a partially spherical configuration. The headlamp assembly further includes a second member supporting the first member. The second member has a partially spherical configuration complementary to the partially spherical configuration of the first member to allow movement of the light device about the center point of rotation.

The present disclosure also provides a vehicle including a support structure. The vehicle includes a headlamp assembly being supported by the support structure. The headlamp assembly includes a light device movable about a center point of rotation. The headlamp assembly also includes a first member supporting the light device. The first member has a partially spherical configuration. The headlamp assembly further includes a second member supporting the first member. The second member has a partially spherical configuration complementary to the partially spherical configuration of the first member to allow movement of the light device about the center point of rotation.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Those having ordinary skill in the art will recognize that terms such as "above", "below", "upward", "up", "downward", "down", "top", "bottom", "left", "right", etc., are used descriptively for the figures, and do not represent limitations on the scope of the disclosure, as defined by the appended claims.

Figure 1:
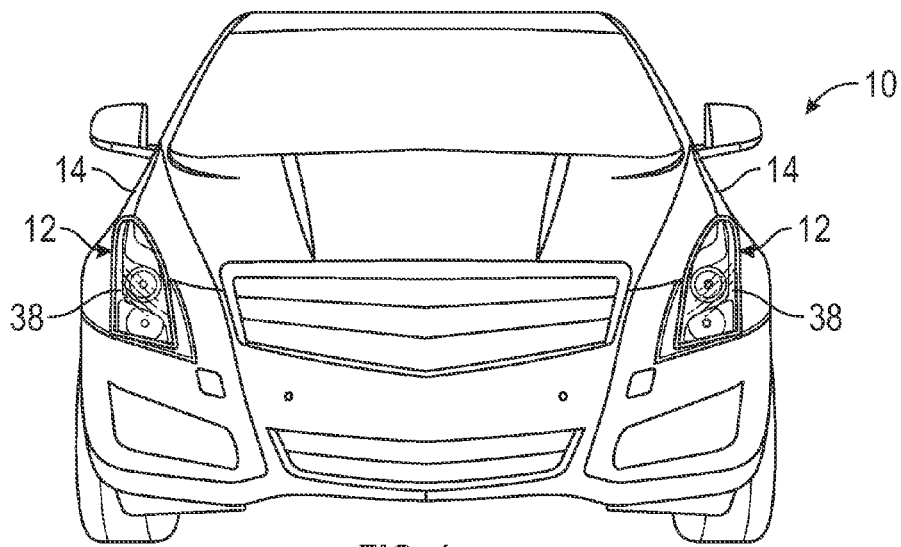
FIG. 1 is a schematic front view of a vehicle illustrating a plurality of headlamp assemblies.

Referring to the Figures, wherein like numerals indicate like or corresponding parts throughout the several views, a vehicle 10 and a headlamp assembly 12 for the vehicle 10 is generally shown in FIG. 1. The headlamp assembly 12 can be utilized to light up an area in front of the vehicle 10. For example, the headlamp assembly 12 can light a road, an object, etc. It is to be appreciated that the headlamp assembly 12 can also include lights for one or more turn signals, fog lights, hazard lights, etc.

Referring to FIG. 1, the vehicle 10 can include a support structure 14. Generally, the headlamp assembly 12 is supported by the support structure 14. The support structure 14 can be a frame, a body, a brace, a panel, etc. Therefore, the support structure 14 can be any suitable configuration to support the headlamp assembly 12.

Figure 2:
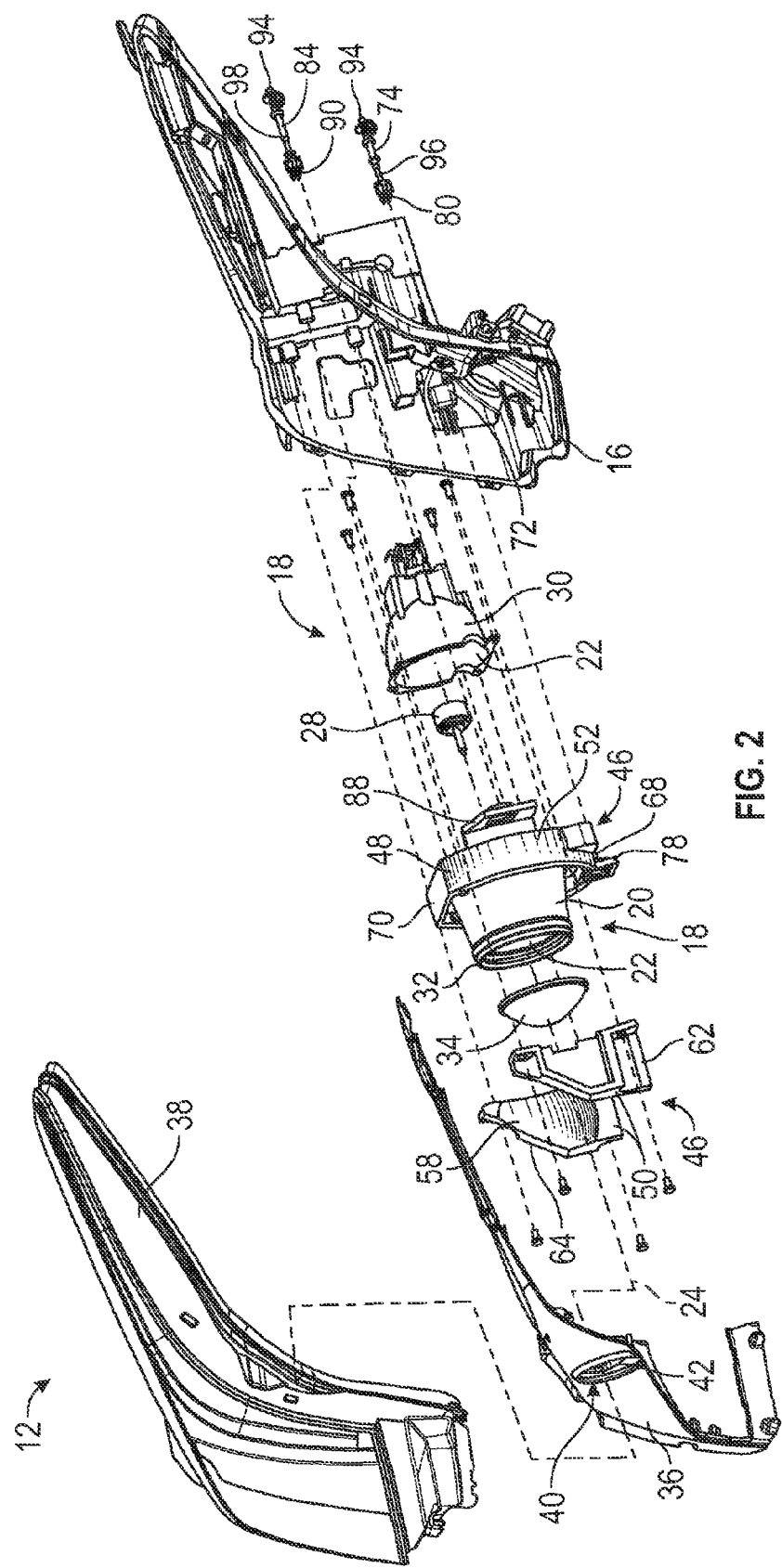
FIG. 2 is a schematic exploded perspective view of one of the headlamp assemblies from FIG. 1.

As best shown in FIG. 2, the headlamp assembly 12 can include a main housing 16. In certain embodiments, the main housing 16 is attached to the support structure 14. The main housing 16 can be other configurations than illustrated in the Figures.

Figure 3:
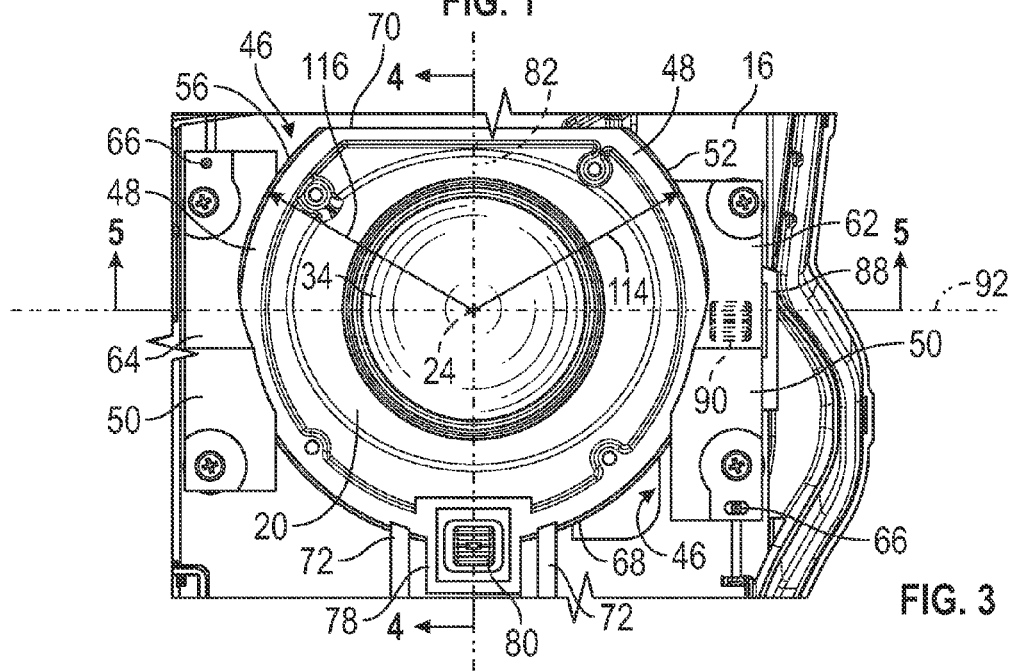
FIG. 3 is a schematic fragmentary front view of one of the headlamp assemblies.
Figure 4:
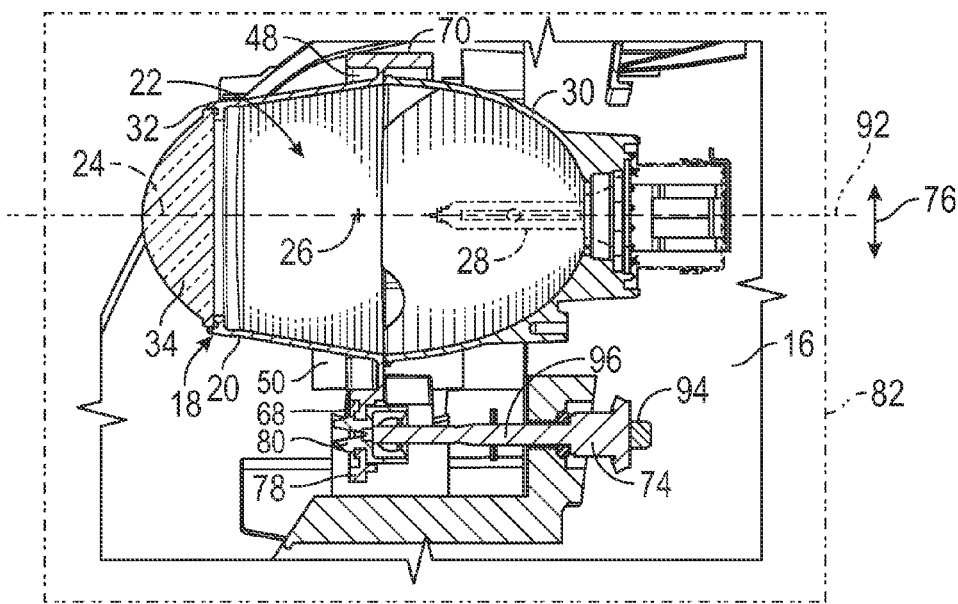
FIG. 4 is a schematic cross-sectional view of one of the headlamp assemblies taken from lines 4-4 of FIG. 3.

Continuing with FIGS. 2-4, the headlamp assembly 12 includes a light device 18 movable about a center point of rotation 26. The light device 18 can further include a casing 20 defining an aperture 22 along a longitudinal axis 24. The light device 18 is movable relative to the main housing 16 about the center point of rotation 26. Generally, the center point of rotation 26 is a point on the longitudinal axis 24.

Figure 5:
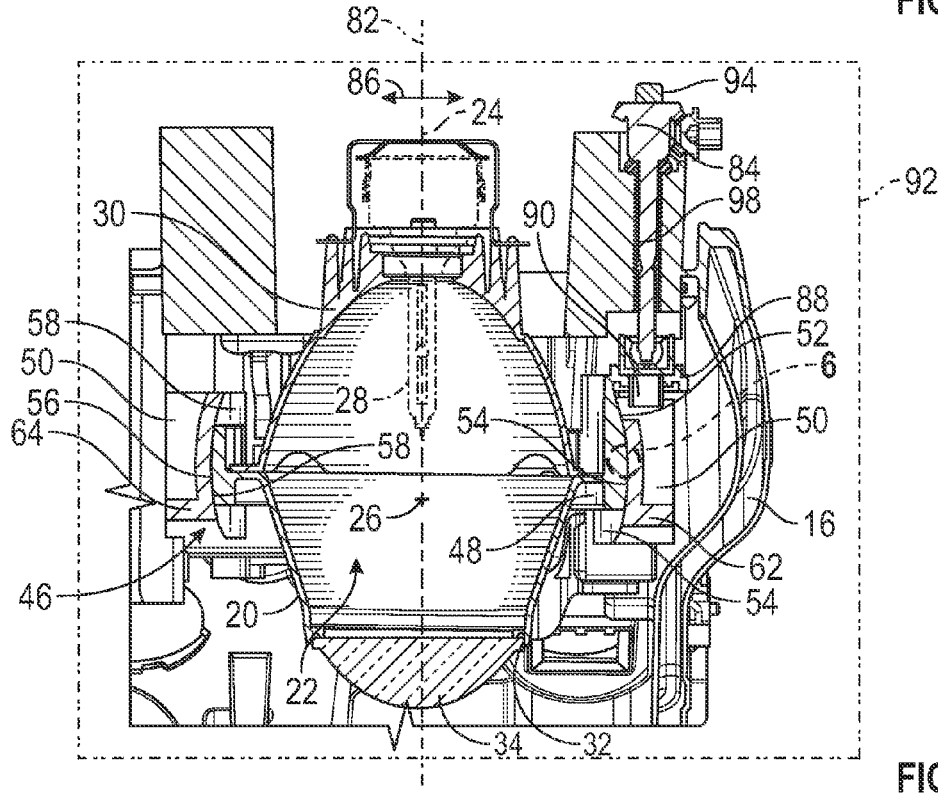
FIG. 5 is a schematic cross-sectional view of one of the headlamp assemblies taken from lines 5-5 of FIG. 3.

Turning to FIGS. 4 and 5, the light device 18 can include an illuminator 28 (shown in phantom lines in FIGS. 4 and 5) to produce the light to illuminate the area in front of the vehicle 10. Generally, the illuminator 28 is coupled to the casing 20. The illuminator 28 can be a light bulb, a light emitting diode (LED), etc. The light device 18 can also include an electrical connection coupled to the illuminator 28 to supply power or current to the illuminator 28 to produce the light. Any suitable electrical connection can be utilized to supply power to the illuminator 28.

As shown in FIGS. 2, 4 and 5, the light device 18 can also include a back cover 30 attached to the casing 20 and also defining the aperture 22 along the longitudinal axis 24. Therefore, the casing 20 and the back cover 30 cooperate to support the illuminator 28 and the electrical connection. Specifically, the illuminator 28 and the electrical connection are attached to the back cover 30, with the illuminator 28 at least partially disposed in the aperture 22. The casing 20 and the back cover 30 move in unison or as a unit relative to the main housing 16. It is to be appreciated that the back cover 30 and the casing 20 can be attached to each other by fasteners, adhesive, integrally formed to each other to define one-piece, etc.

Referring to FIG. 2, the casing 20 includes a distal end 32 spaced from the back cover 30 along the longitudinal axis 24. In certain embodiments, the light device 18 can include a lens 34 attached to the distal end 32 of the casing 20. The lens 34 magnifies the light produced by the illuminator 28. The lens 34 can be any suitable configuration and is generally transparent to allow the light therethrough. The lens 34 is formed of any suitable material(s), and suitable material(s) can include glass, plastic, etc. When utilizing the lens 34 in the light device 18, the light device 18 can be referred to as a projector.

Continuing with FIG. 2, the headlamp assembly 12 can further include a bezel 36 attached to the main housing 16 and a cover 38 attached to the main housing 16 to enclose the bezel 36 and the light device 18 therein. The cover 38 shields the light device 18 from the environment, such as rain, snow, debris, etc. Generally, the cover 38 is at least partially transparent to allow the light therethrough.

Figure 7:
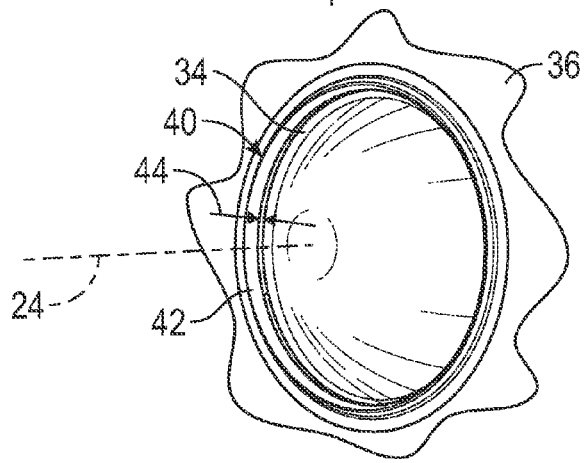
FIG. 7 is a schematic fragmentary perspective view of a bezel and a lens cooperating with each other.

The bezel 36 defines an opening 40 along the longitudinal axis 24 such that the bezel 36 includes an edge 42 adjacent to the opening 40. The lens 34 aligns with the opening 40 of the bezel 36, and specifically, the lens 34 is visible through the cover 38 and the opening 40 from the outside of the vehicle 10 (see FIG. 1). Generally, the light device 18 is movable relative to the bezel 36. As shown in FIG. 7, the edge 42 of the bezel 36 and the distal end 32 of the casing 20 are spaced from each other to define a gap 44 therebetween to allow movement of the lens 34 without engaging the bezel 36. Therefore, the gap 44 prevents engagement between the light device 18 and the bezel 36. Said differently, spacing apart the edge 42 of the bezel 36 and the distal end 32 of the casing 20 prevents engagement of the casing 20 and/or the lens 34 with the bezel 36 during movement of the light device 18. The gap 44 will be discussed further below.

As best shown in FIG. 2, the headlamp assembly 12 also includes a first member 48 supporting the light device 18. Specifically, the first member can be attached to the casing 20 of the light device 18. The first member 48 can be attached to the casing 20 by fasteners, adhesive, welding, soldering, integrally formed to each other to define one-piece, etc. In the Figures, the first member 48 and the casing 20 are illustrated as a unit, i.e., formed as one-piece. The first member 48 and the casing 20 are attached to each other to move together in unison or simultaneously. In certain embodiments, the first member 48 can be attached to the back cover 30 in addition to, or instead of, the casing 20.

Continuing with FIG. 2, the headlamp assembly further includes a second member 50 supporting the first member 48. The second member can be attached to the main housing 16. The second member 50 can be attached to the main housing 16 by fasteners, adhesive, welding, soldering, etc. In the Figures, the second member 50 is attached to the main housing 16 by fasteners. It is to be appreciated that the first and second members 48, 50 can be components of a bracket apparatus 46 that generally support the light device 18.

Generally, the first member 48 has a partially spherical configuration and the second member 50 has a partially spherical configuration complementary to the partially spherical configuration of the first member 48 to allow movement of the light device 18 about the center point of rotation 26. Specifically, the first member 48 can include a first outer surface 52 having the partially spherical configuration (see FIG. 5). The second member 50 can include a first inner surface 54 having the partially spherical configuration (see FIG. 5) complementary to the partially spherical configuration of the first outer surface 52 such that the first member 48 is movable about the center point of rotation 26 relative to the second member 50 to position the light device 18. In other words, the first member 48 is movable relative to the second member 50 to adjust the position of the light device 18 relative to the main housing 16. As shown in the Figures, the first outer surface 52 is a partial sphere, with the center of the sphere being at the center point of rotation 26. Similarly, the first inner surface 54 is a partial sphere, with the center of the sphere being at the center point of rotation 26.

Continuing with FIG. 5, in certain embodiments, the first member 48 can include a second outer surface 56 spaced from the first outer surface 52. In certain embodiments, the first and second outer surfaces 52, 56 are spaced transverse to the longitudinal axis 24. Specifically, the first and second outer surfaces 52, 56 are each spaced radially away from the longitudinal axis 24. Generally, the first and second outer surfaces 52, 56 each face away from the longitudinal axis 24. The second outer surface 56 also has a partially spherical configuration. As shown in the Figures, the second outer surface 56 is a partial sphere, with the center of the sphere being at the center point of rotation 26.

Furthermore, the second member 50 can include a second inner surface 58 spaced from the first inner surface 54. In certain embodiments, the first and second inner surfaces 54, 58 are spaced transverse to the longitudinal axis 24. Specifically, the first and second inner surfaces 54, 58 are each spaced radially away from the longitudinal axis 24. Generally, the first and second inner surfaces 54, 58 each face toward the longitudinal axis 24. Furthermore, the first inner surface 54 and the first outer surface 52 face each other, and similarly, the second inner surface 58 and the second outer surface 56 face each other. The second inner surface 58 also has a partially spherical configuration complementary to the partially spherical configuration of the second outer surface 56 such that the first member 48 is movable about the center point of rotation 26 relative to the second member 50 to position the light device 18. In other words, the partially spherical configuration of the second outer surface 56 and the partially spherical configuration of the second inner surface 58 are complementary to each other to allow the first member 48 to move relative to the second member 50 to adjust the position of the light device 18 relative to the main housing 16. As shown in the Figures, the second inner surface 58 is a partial sphere, with the center of the sphere being at the center point of rotation 26.

The partially spherical configuration of the first outer and inner surfaces 52, 54, as well as, the second outer and inner surfaces 56, 58, allow concentric movement of the light device 18 about the center point of rotation 26. In other words, clearance between the bezel 36 and the light device 18 can be reduced or minimized by the light device 18 moving about the spherical surfaces 52, 54, 56, 58 relative to the center point of rotation 26. Specifically, concentric movement of the light device 18 allows the gap 44 between the bezel 36 and the light device 18 to be minimized as shown in FIG. 7. The gap 44 can be from about greater than about 0.10 millimeters to less than about 9.00 millimeters. In one embodiment, the gap 44 is from about 2.50 millimeters. In another embodiment, the gap 44 is less than 2.50 millimeters. The gap 44 remains substantially the same size during movement of the light device 18. In other words, the gap 44 remains a substantially consistent size when positioning the light device 18.

The first and second members 48, 50 can each be formed of any suitable material. For example, the first and second members 48, 50 can each be formed of a polymeric material and/or a metal material, etc. With regard to the first and second outer surfaces 52, 56, these surfaces 52, 56 can be formed of any suitable material or have a coating applied to the surfaces 52, 56, and suitable materials can be a self-lubricating material or a natural-lubricating material to minimize friction between the first and second outer surfaces 52, 56 and the first and second inner surfaces 54, 58 respectively. Furthermore, the first and second inner surfaces 54, 58 can be formed of any suitable material or have a coating applied to the surfaces 54, 58, and suitable materials can be a self-lubricating material or a natural-lubricating material. Therefore, during movement of the first member 48 relative to the second member 50, friction between the first outer surface 52 and the first inner surface 54 is minimized, and similarly, friction between the second outer surface 56 and the second inner surface 58 is minimized. It is to be appreciated that one or more bearings can be disposed between one or more of these surfaces 52, 54, 56, 58 to minimize frictional engagement between the first and second members 48, 50 during movement of the light device 18. It is to also be appreciated that the casing 20 and/or the back cover 30 can optionally be formed of the same material as the first member 48.

Figure 6:
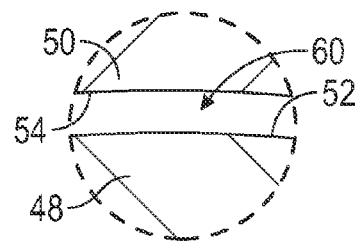
FIG. 6 is a schematic enlarged cross-sectional view of a first outer surface and a first inner surface from line 6 of FIG. 5.

As shown in FIG. 6, the first outer surface 52 and the first inner surface 54 can define a space 60 therebetween. Similarly, the second outer surface 56 and the second inner surface 58 also define the space 60 therebetween similar to the illustration of FIG. 6. Therefore, frictional engagement between the first and second members 48, 50 is minimized during movement of the light device 18. Generally, the space 60 between the first outer and inner surfaces 52, 54, and similarly, the second outer and inner surfaces 56, 58, can be from about 1.0 millimeters. In one embodiment, the space 60 is from about 0.5 millimeters. In another embodiment, the space 60 is from about 0.2 millimeters.

As best shown in FIGS. 2 and 5, the second member 50 can be split into two separate pieces. Specifically, the second member 50 can include a first part 62 having the first inner surface 54 and a second part 64 spaced from the first part 62, with the second part 64 having the second inner surface 58. Therefore, the first and second parts 62, 64 each have the partially spherical configurations. The first and second parts 62, 64 are spaced from each other transverse to the longitudinal axis 24. In certain embodiments, the second member 50 can be one piece instead of being split into two pieces. Furthermore, when the second member 50 is one piece, the second member 50 can partially surround the longitudinal axis 24 or completely surround the longitudinal axis 24. In other embodiments, the second member 50 can be split into more than two pieces, i.e., three or four pieces, etc., with each of these pieces having a partially spherical configuration. Furthermore, as shown in FIG. 3, one or more locator pins 66 can extend through the second member 50, and in one embodiment, one locator pin 66 is disposed through the first part 62 of the second member 50 and another locator pin 66 is disposed through the second part 64 of the second member 50.

Referring to FIGS. 2 and 4, the first member 48 can include a third outer surface 68 and a fourth outer surface 70 spaced from each other transverse to the longitudinal axis 24. Specifically, the third and fourth outer surfaces 68, 70 are spaced from the longitudinal axis 24. The third and fourth outer surfaces 68, 70 are disposed adjacent to the first and second outer surfaces 52, 56. Therefore, in certain embodiments, the first, second, third and fourth outer surfaces 52, 56, 68, 70 can cooperate to completely surround the longitudinal axis 24. As such, generally, the first member 48 can entirely surround the longitudinal axis 24 as best shown in FIG. 3. In other embodiments, the first member 48 can partially surround the longitudinal axis 24.

In the embodiment shown in FIGS. 2-4, the fourth outer surface 70 does not have a partially spherical configuration while the third outer surface 68 has a partially spherical configuration. It is to be appreciated that the main housing 16 can optionally include a base 72 (see FIG. 3) to assist in supporting the first member 48, and specifically, the base 72 can support the third outer surface 68; and in this embodiment, the base 72 has a partially spherical configuration cooperating with the partially spherical configuration of the third outer surface 68 to allow movement of the first member 48 relative to the main housing 16. The base 72 can be a partial sphere, with the center of the sphere being at the center point of rotation 26, and similarly, the third outer surface 68 can be a partial sphere, with the center of the sphere being at the center point of rotation 26. In another embodiment, the third and/or fourth outer surfaces 68, 70 can each have a partially spherical configuration, and in this embodiment, the second member 50 can include one or more inner surfaces each being a partially spherical configuration corresponding to the partially spherical configurations of the third and/or fourth outer surfaces 68, 70.

Turning to FIGS. 2, 4 and 5, the headlamp assembly 12 can further include a first adjustor 74 secured to the first member 48 such that actuation of the first adjustor 74 moves the light device 18 about the center point of rotation 26 in a first travel path 76 (see arrow 76 in FIG. 4). Specifically, in one embodiment, the first adjustor 74 is secured to the main housing 16 and the first member 48 such that actuation of the first adjustor 74 moves the light device 18 about the center point of rotation 26 in the first travel path 76 (see arrow 76 in FIG. 4). Generally, in certain embodiments, the first travel path 76 is upwardly and downwardly relative to the center point of rotation 26, and in this example, the first travel path 76 is also upwardly and downwardly relative to the longitudinal axis 24. In other words, the first travel path 76 can move the lens 34 of the light device 18 upwardly to direct the light in front of the vehicle 10 higher (such as away from the road) or the first travel path 76 can move the lens 34 of the light device 18 downwardly to direct the light in front of the vehicle 10 lower (such as toward the road). Simply stated, the first travel path 76 is generally vertical.

The first adjustor 74 can be coupled to one of the first, second, third and fourth outer surfaces 52, 56, 68, 70 to move the light device 18 about the center point of rotation 26. In certain embodiments, the first adjustor 74 is coupled to one of the third and fourth outer surfaces 68, 70 to move the light device 18 about the center point of rotation 26 in the first travel path 76. In one embodiment, as best shown in FIG. 4, the first adjustor 74 is coupled to the third outer surface 68.

Turning to FIGS. 2 and 4, the first member 48 can include a first branch 78 extending outwardly away from the third outer surface 68. Specifically, the first branch 78 extends away from the longitudinal axis 24. The first branch 78 can be attached to the third outer surface 68 by fasteners, adhesive, welding, soldering, integrally formed to each other to define one-piece, etc. In the Figures, the first branch 78, the first member 48 and the casing 20 are illustrated as a unit, i.e., formed as one-piece. The first adjustor 74 is attached to the first branch 78 to move the light device 18 about the center point of rotation 26 in the first travel path 76. Additionally, the first adjustor 74 can be secured to the first branch 78 to support the first member 48 to maintain the space 60 between the first outer and inner surfaces 52, 54 as well as the space 60 between the second outer and inner surfaces 56, 58. In other embodiments, the first branch 78 extends outwardly away from the fourth outer surface 70 and away from the longitudinal axis 24.

The first adjustor 74 can be attached to the first branch 78 by fasteners, adhesive, etc. For example, as best shown in FIG. 2, the first adjustor 74 is attached to the first branch 78 by a fastener embodied as a clip or tab 80. A first plane 82 is disposed perpendicular to the longitudinal axis 24 to present a vertical orientation, with the first plane 82 intersecting the first adjustor 74. Furthermore, the first adjustor 74 is spaced from the longitudinal axis 24. Therefore, the first adjustor 74 can be located in a spaced and aligning relationship with the longitudinal axis 24. Positioning the first adjustor 74 as discussed herein provides a space saving.

Referring to FIGS. 2, 4, and 5, the headlamp assembly 12 can optionally include a second adjustor 84 secured to the first member 48 such that actuation of the second adjustor 84 moves the light device 18 about the center point of rotation 26 in a second travel path 86 (see arrow 86 in FIG. 5) different from the first travel path 76. Generally, the first and second adjustors 74, 84 are spaced from each other. In one embodiment, the second adjustor 84 is secured to the main housing 16 and the first member 48 such that actuation of the second adjustor 84 moves the light device 18 about the center point of rotation 26 in a second travel path 86 (see arrow 86 in FIG. 5) different from the first travel path 76. Generally, the second travel path 86 is leftwardly and rightwardly relative to the center point of rotation 26, and in this example, the second travel path 86 is also leftwardly and rightwardly relative to the longitudinal axis 24. In other words, the second travel path 86 can move the lens 34 of the light device 18 leftwardly to direct light in front of the vehicle 10 farther left from its previous position or the second travel path 86 can move the lens 34 of the light device 18 rightwardly to direct light in front of the vehicle 10 farther right from its previous position. Simply stated, the second travel path 86 is generally horizontal. Said differently, the second travel path 86 is cross-car, i.e., side to side. Therefore, the first and second travel paths 76, 86 are different in that the first travel path 76 is up and down (vertical) while the second travel path 86 is left and right (horizontal).

The second adjustor 84 can be coupled to one of the first, second, third and fourth outer surfaces 52, 56, 68, 70 to move the light device 18 about the center point of rotation 26. In certain embodiments, the second adjustor 84 is coupled to one of the first and second outer surfaces 52, 56 to move the light device 18 about the center point of rotation 26 in the second travel path 86 (different from the first travel path 76 as detailed above). In one embodiment, as best shown in FIG. 5, the second adjustor 84 is coupled to the first outer surface 52. It is to be appreciated that when utilizing only one adjustor, the first adjustor 74 can be coupled to the first member 48 in any suitable location to provide movement of the light device 18 in the first travel path 76 or the second travel path 86.

Referring to FIGS. 2 and 5, the second member 50 can include a second branch 88 extending outwardly away from the first outer surface 52. Specifically, the second branch 88 extends away from the longitudinal axis 24. The second branch 88 can be attached to the first outer surface 52 by fasteners, adhesive, welding, soldering, integrally formed to each other to define one-piece, etc. In the Figures, the second branch 88, the first member 48 and the casing 20 are illustrated as a unit, i.e., formed as one-piece. The second adjustor 84 is attached to the second branch 88 to move the light device 18 about the center point of rotation 26 in the second travel path 86. Additionally, the second adjustor 84 can be secured to the second branch 88 to support the first member 48 to maintain the space 60 between the first outer and inner surfaces 52, 54 as well as the second outer and inner surfaces 56, 58. In other embodiments, the second branch 88 extends outwardly away from the second outer surface 56 and away from the longitudinal axis 24.

The second adjustor 84 can be attached to the second branch 88 by fasteners, adhesive, etc. For example, as best shown in FIG. 2, the second adjustor 84 is attached to the second branch 88 by a fastener embodied as a clip or tab 90. A second plane 92 is disposed perpendicular to the first plane 82 to define a horizontal orientation, with the second plane 92 intersecting the second adjustor 84. Furthermore, the second plane 92 is disposed perpendicular to the longitudinal axis 24, with the second adjustor 84 spaced from the longitudinal axis 24. Therefore, the second adjustor 84 can be located in a spaced and aligning relationship with the longitudinal axis 24. Positioning the second adjustor 84 as discussed herein provides a space saving.

The first and second adjustors 74, 84 can be manual actuated or automatically actuated by any suitable method. For example, each of the first and second adjustors 74, 84 can have a knob 94, handle, etc. that can be turned either manually or automatically. Turning the knob 94 of the first adjustor 74 causes a segment 96 of the first adjustor 74 to move back or forth which correspondingly causes the first branch 78 to move; and movement of the first branch 78 causes the light device 18 to rotate about the center point of rotation 26 in the first travel path 76. Similarly, turning the knob 94 of the second adjustor 84 causes a segment 98 of the second adjustor 84 to move back or forth which correspondingly causes the second branch 88 to move; and movement of the second branch 88 causes the light device 18 to rotate about the center point of rotation 26 in the second travel path 86. For automatic actuation of the adjustors 74, 84, a motor, etc. can be utilized.

It is to be appreciated that only one adjustor 74 can be utilized in the headlamp assembly 12 or both adjustors 74, 84 can be utilized in the headlamp assembly 12. It is to also be appreciated that more than two adjustors 74, 84 can be utilized in the headlamp assembly 12. Additionally, the adjustors 74, 84 can be coupled to the first member 48 in different locations than illustrated. Furthermore, one or more additional adjustors can be coupled to the first member 48 to provide diagonal movement of the light device 18 relative to the longitudinal axis 24.

Figure 8:
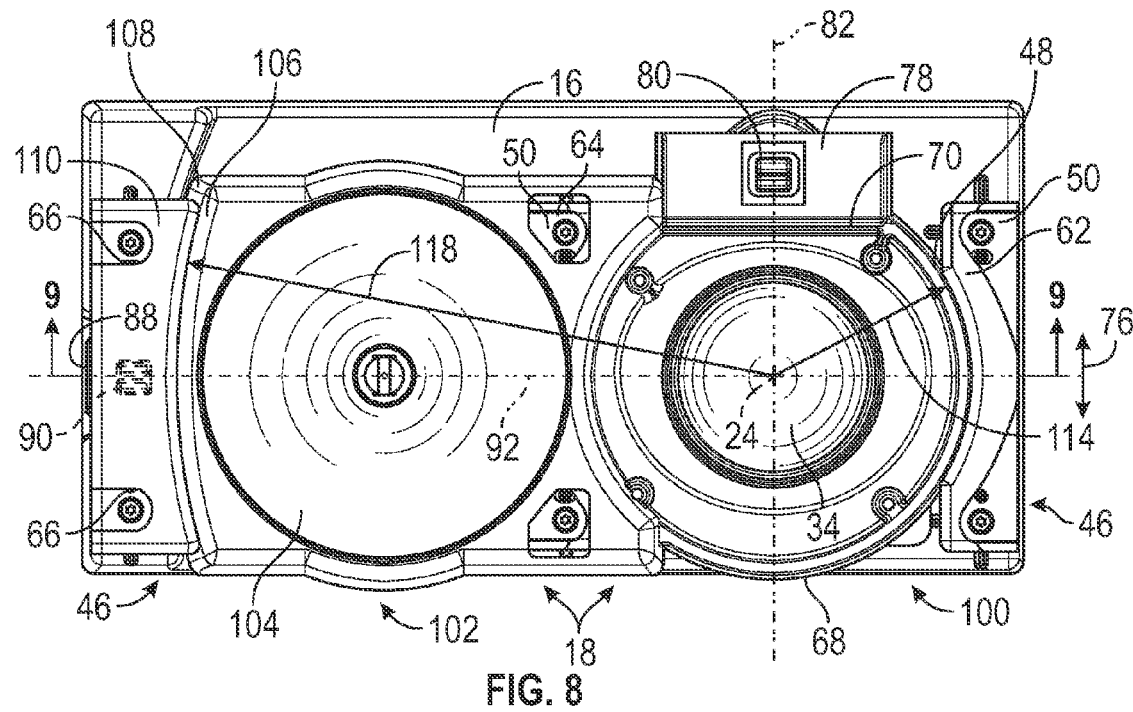
FIG. 8 is a schematic front view of another embodiment of the headlamp assembly.
Figure 9:
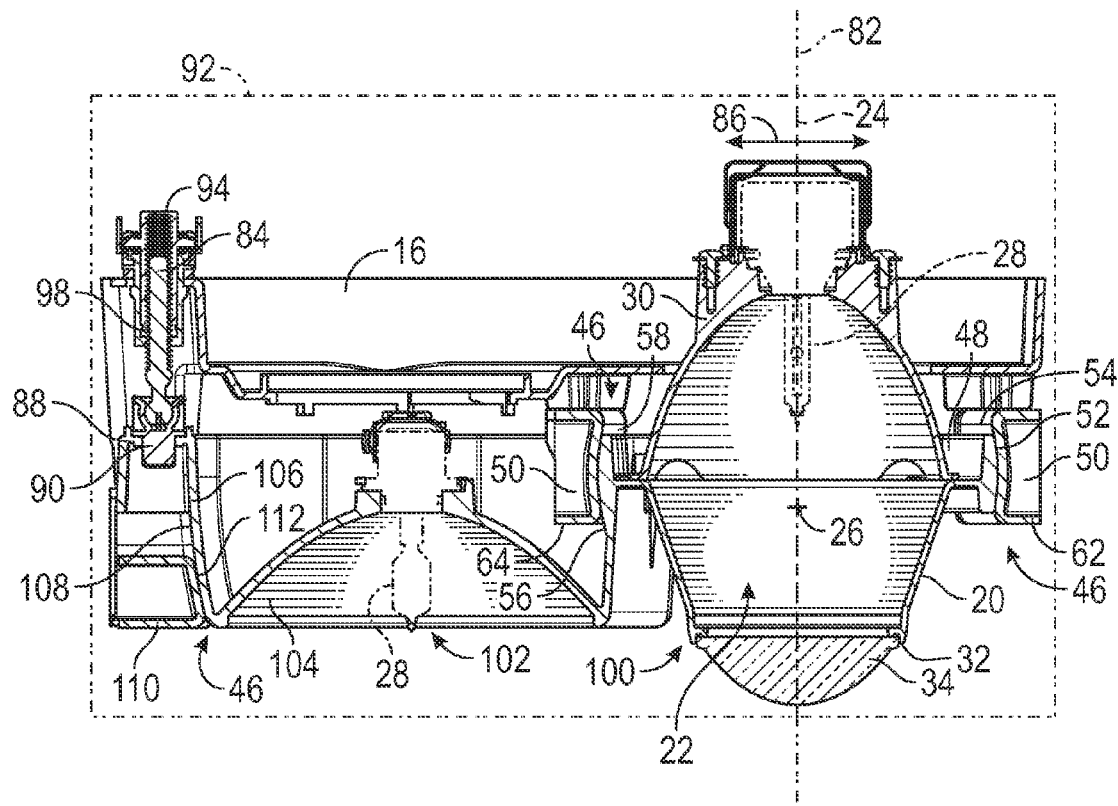
FIG. 9 is a schematic cross-sectional view of the headlamp assembly taken from lines 9-9 of FIG. 8.

The headlamp assembly 12 discussed above is one suitable configuration and other suitable configurations are contemplated. For example, as shown in FIGS. 8 and 9, the headlamp assembly 12 can be configured to utilize the projector as discussed above and a reflector as discussed below. Specifically, the casing 20 can include a projector lighting portion 100 and a reflector lighting portion 102 adjacent to each other. In certain embodiments, the projector lighting portion 100 aligns with the longitudinal axis 24 and the reflector lighting portion 102 is spaced from the longitudinal axis 24. The projector lighting portion 100 and the reflector lighting portion 102 can be attached to each other such that these lighting portions 100, 102 move together as a unit.

The light device 18 can include the lens 34 attached to the projector lighting portion 100 of the casing 20 to magnify light. Furthermore, the light device 18 can include a mirror 104 attached to the reflector lighting portion 102 of the casing 20 to reflect light. One illuminator 28 is coupled to the projector lighting portion 100 and another illuminator 28 is coupled to the reflector lighting portion 102 to produce the light to illuminate the area in front of the vehicle 10. When utilizing the mirror 104 in the light device 18, the light device 18 can be referred to as the reflector. When utilizing the lens 34 and the mirror 104, the light device 18 can be referred to as a projector-reflector. For example, when utilizing both the projector-reflector, the projector can be for the low beams of the vehicle 10 and the reflector can be for the high beams of the vehicle 10.

The first member 48 is attached to the projector lighting portion 100 and the headlamp assembly 12 can include a third member 106 attached to the reflector lighting portion 102. The third member 106 can include a first outer surface 108 having a partially spherical configuration. Furthermore, the headlamp assembly 12 can include a fourth member 110 attached to the main housing 16. The fourth member 110 can include a first inner surface 112 having a partially spherical configuration complementary to the partially spherical configuration of the first outer surface 108 of the third member 106 such that the third member 106 is movable about the center point of rotation 26 relative to the fourth member 110 to position the light device 18. Optionally, one of the first and second parts 62, 64 of the second member 50 can be eliminated in this embodiment. It is to be appreciated that the third and fourth members 106, 110 can also be components of the bracket apparatus 46.

For the embodiments of FIGS. 3 and 8, the partially spherical configuration of the first member 48 is spaced a first radial distance 114 from the longitudinal axis 24. More specifically, the partially spherical configuration of the first outer surface 52 of the first member 48 is spaced the first radial distance 114 from the longitudinal axis 24. Furthermore, the partially spherical configuration of the second outer surface 56 of the first member 48 is spaced a second radial distance 116 from the longitudinal axis 24, with the first and second radial distances 114, 116 being the same. For the embodiment of FIG. 8, the partially spherical configuration of the third member 106 is spaced a third radial distance 118 from the longitudinal axis 24. Specifically, the partially spherical configuration of the first outer surface 108 of the third member 106 is spaced the third radial distance 118 from the longitudinal axis 24. As shown in FIG. 8, the third radial distance 118 is greater than the first radial distance 114. Therefore, the center point of rotation 26 is the same for the projector and reflector lighting portions 100, 102 and thus these portions 100, 102 move together as a unit. It is to be appreciated any suitable sphere size can be utilized and thus any suitable radial distance can be utilized.

The first adjustor 74 (the details are discussed above), for this embodiment, coupled to one of the projector lighting portion 100 and the reflector lighting portion 102 to move the light device 18 about the center point of rotation 26 such that the projector lighting portion 100 and the reflector lighting portion 102 move as the unit. Furthermore, the first adjustor 74 is secured to the main housing 16. In one embodiment, the first adjustor 74 is coupled to the main housing 16 and the projector lighting portion 100 to move the light device 18 about the center point of rotation 26 in the first travel path 76. Generally, the first adjustor 74 is coupled to one of the first, second, third and fourth outer surfaces 52, 56, 68, 70 of the first member 48 to move the light device 18 about the center point of rotation 26. In certain embodiments, the first adjustor 74 is coupled to one of the third and fourth outer surfaces 68, 70 of the first member 48 to move the light device 18 about the center point of rotation 26 in the first travel path 76. In the embodiment of FIGS. 8 and 9, the first travel path 76 is upwardly and downwardly relative to the center point of rotation 26. As shown in FIG. 8, the first adjustor 74 is coupled to the fourth outer surface 70 of the first member 48. Generally, in certain embodiments, the first travel path 76 is upwardly and downwardly relative to the center point of rotation 26, and in this example, the first travel path 76 is also upwardly and downwardly relative to the longitudinal axis 24. In other words, the first travel path 76 can move the lens 34 and the mirror 104 of the light device 18 upwardly to direct the light in front of the vehicle 10 higher (such as away from the road) or the first travel path 76 can move the lens 34 and the mirror 104 of the light device 18 downwardly to direct the light in front of the vehicle 10 lower (such as toward the road). Simply stated, the first travel path 76 is generally vertical as discussed above for the other embodiment.

The second adjustor 84 (the details are discussed above), for this embodiment, coupled to one of the projector lighting portion 100 and the reflector lighting portion 102 to move the light device 18 about the center point of rotation 26 such that the projector lighting portion 100 and the reflector lighting portion 102 move as the unit. Furthermore, the second adjustor 84 is secured to the main housing 16. In one embodiment, the second adjustor 84 is coupled to the main housing 16 and the reflector lighting portion 102 to move the light device 18 about the center point of rotation 26 in the second travel path 86. Generally, the second adjustor 84 is coupled to one of the first outer surface 108 of the third member 106 and the first or second outer surfaces 52, 56 of the first member 48 to move the light device 18 about the center point of rotation 26 in the second travel path 86. As shown in FIG. 9, the second adjustor 84 is coupled to the first outer surface 108 of the third member 106. In the embodiment of FIGS. 8 and 9, the second travel path 86 is leftwardly and rightwardly relative to the center point of rotation 26, with the second adjustor 84 coupled to the first outer surface 52 of the third member 106. Generally, the second travel path 86 is leftwardly and rightwardly relative to the center point of rotation 26, and in this example, the second travel path 86 is also leftwardly and rightwardly relative to the longitudinal axis 24. In other words, the second travel path 86 can move the lens 34 and the mirror 104 of the light device 18 leftwardly to direct light in front of the vehicle 10 farther left from its previous position or the second travel path 86 can move the lens 34 and the mirror 104 of the light device 18 rightwardly to direct light in front of the vehicle 10 farther right from its previous position. Simply stated, the second travel path 86 is generally horizontal as discussed above for the other embodiment. Said differently, the second travel path 86 is cross-car, i.e., side to side. It is to be appreciated that only one adjustor 74 or more than two adjustors 74, 84 can be utilized for the embodiment of FIGS. 8 and 9. It is to also be appreciated that one or more additional adjustors can provide diagonal movement of the light device 18. Furthermore, optionally, as partially shown in FIG. 8, one or more locator pins 66 can extend through the fourth member 110.

Furthermore, as illustrated in FIG. 1, a plurality of headlamp assemblies 12 can be utilized. Generally, one headlamp assembly 12 is disposed along a driver's side of the vehicle 10 and another headlamp assembly 12 is disposed along a passenger's side of the vehicle 10. It is to be appreciated that each headlamp assembly 12 can be configured with the features discussed above.

The headlamp assembly 12 as described herein provides a compact assembly which reduces the packaging space needed in the vehicle 10. Furthermore, providing concentric movement of the light device 18 allows the gap 44 between the bezel 36 and the light device 18 to be minimized, thus providing a space savings. Additionally, positioning the first and second adjustors 74, 84 as discussed herein provides a space saving.

While the best modes for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A headlamp assembly for a vehicle, the assembly comprising:
 a light device movable about a center point of rotation;
 a first member supporting the light device and having a partially spherical configuration; and
 a second member supporting the first member and having a partially spherical configuration complementary to the partially spherical configuration of the first member to allow movement of the light device about the center point of rotation.

2. An assembly as set forth in claim 1 wherein the first member includes a first outer surface having the partially spherical configuration and the second member includes a first inner surface having the partially spherical configuration complementary to the partially spherical configuration of the first outer surface such that the first member is movable about the center point of rotation relative to the second member to position the light device.

3. An assembly as set forth in claim 2 wherein the first member includes a second outer surface spaced from the first outer surface and the second outer surface has a partially spherical configuration, and wherein the second member includes a second inner surface spaced from the first inner surface and the second inner surface has a partially spherical configuration complementary to the partially spherical configuration of the second outer surface such that the first member is movable about the center point of rotation relative to the second member to position the light device.

4. An assembly as set forth in claim 3 wherein the second member includes a first part having the first inner surface and a second part spaced from the first part, with the second part having the second inner surface.

5. An assembly as set forth in claim 3 wherein the light device includes a casing defining an aperture along a longitudinal axis, with the center point of rotation being a point on the longitudinal axis, and wherein the first and second outer surfaces each face away from the longitudinal axis and the first and second inner surfaces each face toward the longitudinal axis.

6. An assembly as set forth in claim 5 further including a main housing, with the light device movable relative to the main housing about the center point of rotation, and with the first member being attached to the casing of the light device and the second member being attached to the main housing.

7. An assembly as set forth in claim 6 wherein the first member includes a third outer surface and a fourth outer surface spaced from each other transverse to the longitudinal axis, with the third and fourth outer surfaces disposed adjacent to the first and second outer surfaces, and further including a first adjustor secured to the main housing and coupled to one of the first, second, third and fourth outer surfaces to move the light device about the center point of rotation.

8. An assembly as set forth in claim 7 wherein the first adjustor is coupled to one of the third and fourth outer surfaces to move the light device about the center point of rotation in a first travel path, and further including a second adjustor secured to the main housing and coupled to one of the first and second outer surfaces to move the light device about the center point of rotation in a second travel path different from the first travel path.

9. An assembly as set forth in claim 8 wherein the first adjustor is coupled to the third outer surface and the second adjustor is coupled to the first outer surface.

10. An assembly as set forth in claim 9 wherein the first member includes a first branch extending outwardly away from the third outer surface, with the first adjustor attached to the first branch to move the light device about the center point of rotation in the first travel path.

11. An assembly as set forth in claim 9 wherein the second member includes a second branch extending outwardly away from the first outer surface, with the second adjustor attached to the second branch to move the light device about the center point of rotation in the second travel path.

12. An assembly as set forth in claim 8 further including a first plane disposed perpendicular to the longitudinal axis to define a vertical orientation, with the first plane intersecting the first adjustor, and the first adjustor being spaced from the longitudinal axis.

13. An assembly as set forth in claim 12 further including a second plane disposed perpendicular to the first plane to define a horizontal orientation, with the second plane intersecting the second adjustor, and the second adjustor being spaced from the longitudinal axis.

14. An assembly as set forth in claim 1 further including a first adjustor secured to the first member such that actuation of the first adjustor moves the light device about the center point of rotation in a first travel path.

15. An assembly as set forth in claim 14 further including a second adjustor secured to the first member such that actuation of the second adjustor moves the light device about the center point of rotation in a second travel path different from the first travel path, with the first and second adjustors spaced from each other.

16. An assembly as set forth in claim 15 further including:
 a first plane disposed perpendicular to the longitudinal axis to define a vertical orientation, with the first plane intersecting the first adjustor, and the first adjustor being spaced from the longitudinal axis; and
 a second plane disposed perpendicular to the first plane to define a horizontal orientation, with the second plane intersecting the second adjustor, and the second adjustor being spaced from the longitudinal axis.

17. An assembly as set forth in claim 1 wherein:
 the light device includes a casing defining an aperture along a longitudinal axis, with the center point of rotation being a point on the longitudinal axis;
 the casing includes a projector lighting portion and a reflector lighting portion adjacent to each other; and
 the light device includes a lens attached to the projector lighting portion of the casing to magnify light and the light device includes a mirror attached to the reflector lighting portion of the casing to reflect light.

18. An assembly as set forth in claim 17 further including a main housing, and wherein the first member is attached to the projector lighting portion and further including a third member attached to the reflector lighting portion and including a first outer surface having a partially spherical configuration, and further including a fourth member attached to the main housing and including a first inner surface having a partially spherical configuration complementary to the partially spherical configuration of the first outer surface of the third member such that the third member is movable about the center point of rotation relative to the fourth member to position the light device.

19. An assembly as set forth in claim 18 wherein the partially spherical configuration of the first member is spaced a first radial distance from the longitudinal axis and the partially spherical configuration of the third member is spaced a third radial distance from the longitudinal axis, with the third radial distance being greater than the first radial distance, and further including a first adjustor coupled to one of the projector lighting portion and the reflector lighting portion to move the light device about the center point of rotation such that the projector lighting portion and the reflector lighting portion move as a unit.

20. A vehicle comprising:
   a support structure;
   a headlamp assembly being supported by the support structure and the headlamp assembly comprising:
      a light device movable about a center point of rotation;
      a first member supporting the light device and having a partially spherical configuration; and
      a second member supporting the first member and having a partially spherical configuration complementary to the partially spherical configuration of the first member to allow movement of the light device about the center point of rotation.

* * * * *